United States Patent [19]

Cook

[11] 4,423,952
[45] Jan. 3, 1984

[54] METHOD AND APPARATUS FOR COMPUTING DATA FOR PRODUCING PHOTO PRINTS

[76] Inventor: Harland K. Cook, 528 Kingsley Ave., Waterloo, Iowa 50701

[21] Appl. No.: 245,129

[22] Filed: Jun. 3, 1981

[51] Int. Cl.³ .............................................. G03B 27/80
[52] U.S. Cl. ....................................................... 355/38
[58] Field of Search ........................ 355/38, 68, 71, 77

[56] References Cited

U.S. PATENT DOCUMENTS

| 4,025,190 | 5/1977 | Hughes | 355/68 |
| 4,286,868 | 9/1981 | Laska | 355/68 |
| 4,299,479 | 11/1981 | Harvey et al. | 355/68 X |

Primary Examiner—Michael L. Gellner
Attorney, Agent, or Firm—James C. Nemmers

[57] ABSTRACT

A method and apparatus as described for determining the correct exposure time for either black and white or color negatives or positives. The apparatus fully automates the printing process by taking into account all necessary factors thus assuring first print capability. The density of the equipment light, the film and the filters are all measured at the same time and result in a single readout which will be the correct density-exposure time.

3 Claims, 1 Drawing Figure

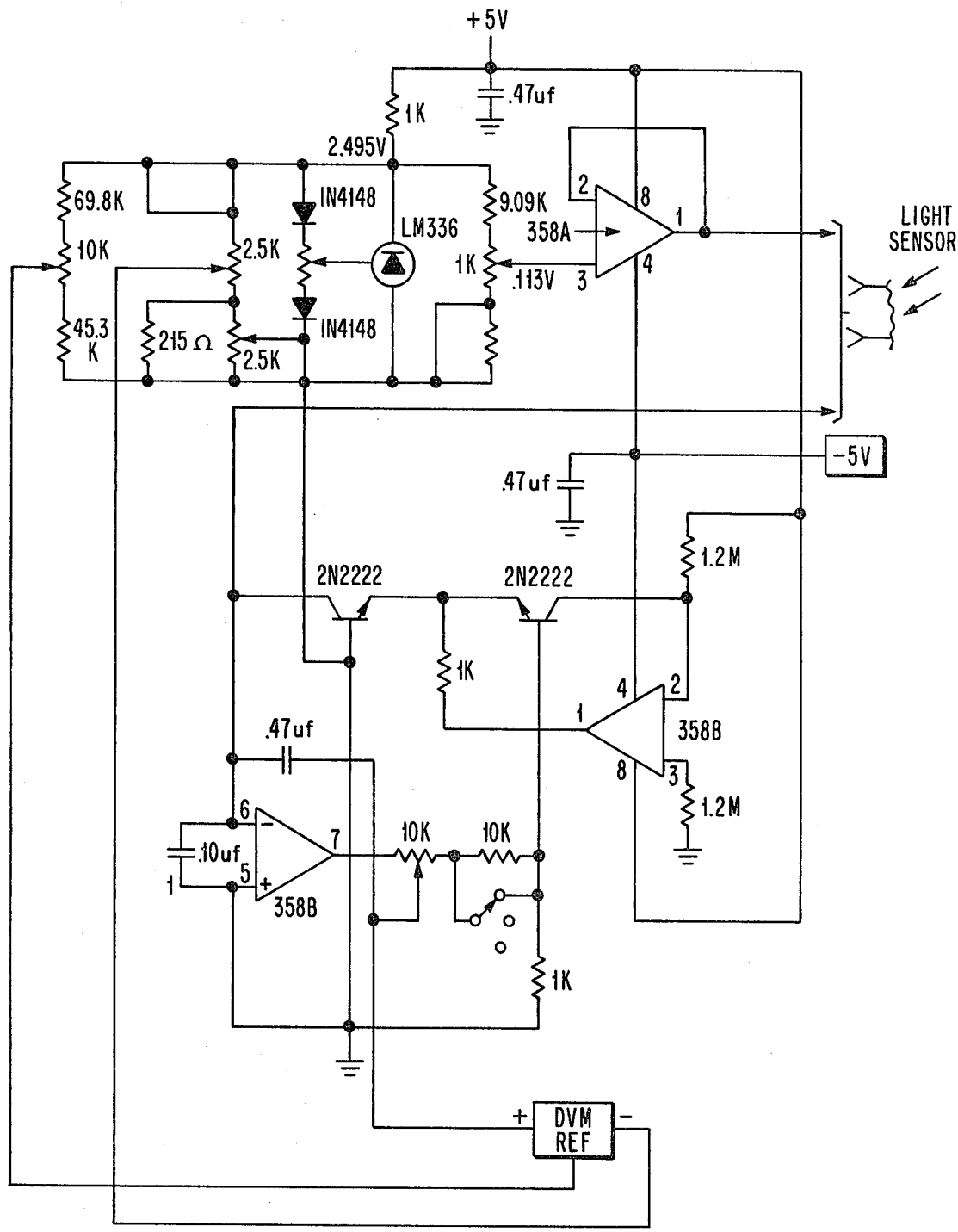

METHOD AND APPARATUS FOR COMPUTING DATA FOR PRODUCING PHOTO PRINTS

BACKGROUND OF THE INVENTION

This invention relates to improvements in the printing of photographic color and black and white negatives or positives.

The printing of photo prints, either black and white or color but especially color, has for many years been an art rather than a science. Present methods involve the use of color analyzers and densitometers to produce test prints which are then judged, adjustments made and final prints prepared. None of the prior art methods or equipment provide first print capabilities. Frequently, the first and sometimes subsequent prints are not good prints, and the printing process becomes a hit and miss type operation. This wastes time and labor as well as materials and increases the cost of making prints. This cost is relatively high especially where large color prints are being produced. Generally, the negative (or positive) to be printed is placed in the lens of an enlarger, and the image is focused on the base plate upon which the color print is to be placed. When properly focused, the necessary color filters as determined by the supplier of the print paper are placed on the lens and the print paper is placed on the base plate. The print paper is then exposed for a time that is determined strictly by guess. The success of the printing process thus depends upon many factors including the experience of the operator. This results frequently in having to make three or four prints before the correct exposure time is determined thus wasting expensive print paper and contributing to the high cost of making prints especially color enlargements from color slides. The prior art does not disclose any method or apparatus by which the correct density-exposure time can be determined quickly and accurately the first time so that the first print will be as good as the last. This is true even though there are known and used relatively expensive color analyzers and densitometers to assist the darkroom operator. There is therefore a need for a simple, inexpensive and accurate method and apparatus that will assure first print capability in the photo printing process.

SUMMARY OF THE INVENTION

The method and apparatus of the invention takes into consideration the missing light intensity between the photo printing equipment, the film density and the density of the filters required to properly correct the films in either black and white or color photography. The method and apparatus of the invention utilizes a built-in densitometer which can separate each of these requirements and compute the exact density-exposure time down to a fraction of a second thus giving 100% control and first print capability. The method and system of the invention further utilizes a system of reversal light measurement that enables the apparatus to read high on the dark areas of the image and low on the bright areas of the image which readings are timed into current darkroom timer equipment so as to automatically give the correct density-exposure time.

The foregoing is accomplished in a relatively simple and inexpensive apparatus which will produce in a matter of seconds the correct density exposure for photo printing. The apparatus is further programmed for different types of prints and thus is useful in all photo printing operations.

BRIEF DESCRIPTION OF THE DRAWING

The drawing is a schematic wiring diagram of an apparatus constructed according to the principles of the invention.

DESCRIPTION OF THE PREFERRED EMBODIMENT OF THE INVENTION

The drawing is a schematic diagram of my novel system and includes a light sensor such as a photo cell which is driven by amplifier 358A to hold the voltage across the light sensor constant at a selected reference voltage. A trim pot in series with two IN4148 diodes is used to adjust the circuit to the reference voltage while IC LM336 holds the circuit at the reference voltage. The light sensor is held at a constant reference voltage so that as the light reaching a light sensor varies, the current varies linearly thus giving an indication of the intensity of the light applied to the light sensor which intensity is indicated on a digital display.

The circuit also includes a 10K trim pot which is used to adjust the calibration of the volt meter.

The novel system of the invention includes what have been termed a "zero compute" or a "coarse zero adjustment" and a "fine zero" compute of adjustment which consist, respectively, of a first 2.5K potentiometer and a second 2.5K potentiometer across which there is a 215 ohm resistor. These two zero adjustments are used to subtract the available light during the printing operation in a manner described hereinafter.

Also included in the system is a logarithmic amplifier consisting of the two amplifiers 358B and the two transistors 2N2222. This logarithmic amplifier outputs a voltage that is a logarithmic function of the current in the photo cell. A 10K potentiometer is used as a "program set control" in the manner described hereinafter, and is preferably not linear but a reverse logarithmic potentiometer. In other words, the 10K potentiometer that comprises the program set control increases in resistance at a much faster rate the further the potentiometer is turned. A toggle switch is also provided and used as a multiplier to switch from a high to low range depending upon the density of the negative with the high range being used for very dense negatives and thus providing more sensitivity to the system. The toggle switch is shown in the low range on the drawing.

The system as thus described is used in the following manner in the darkroom. Both the coarse zero adjustment and the fine zero adjustment are set to zero. Also, the program set control is set at a zero reading. The toggle switch is set on the low range unless a negative or transparency of very high density is to be printed. The negative or transparency is then inserted in the enlarger which is then focused and composed for the size of photo and adjusted for a clear well-defined image. The film is then removed (no filters are in place at this time) and the light sensor is placed in the center of the white light area and the coarse zero adjustment and fine zero adjustment are reset again to a zero reading. This step removes or subtracts the available light. The negative or transparency is then placed in the enlarger and the light sensor is moved over the medium or average density areas of the image to produce an output reading. If desired, the light sensor can be moved over to several areas of medium density and an average reading determined. In either event, the resulting reading is then set in the program set control. Depending upon how the program set control is calibrated, the darkroom operator may have to set the program set control at a multiple of the actual reading determined from the density readings. I have found that for prints most pleasing to the eye, that this multiple is 10 although if the darkroom operator wants a print of lighter or darker intensity, a different multiple can be used. The darkroom operator will then place in the enlarger the desired filters which depend upon the film being used, etc. as recommended by the film manufacturer. When the filters are in place, the output received from the light sensor will change, and the output reading on the digital display is the exact exposure time in seconds.

I have thus designed a method and apparatus for determining with extreme accuracy the exact exposure time necessary for printing of all types of photo printing. This includes all types of darkroom photo printing, newsprint photo printing, four color process printing and television pre-color computing. The coarse zero or "zero compute" and fine zero compute adjustments are used to zero the reading of the white light or available light emitted from the enlarger lens so that this amount of light may be subtracted from any photo printing equipment. This thus permits adding in the exposure time for the film density and the filters for completely accurate exposure time. Because of this capability of zero measurement on any equipment, the method and system of the invention can permit the permanent filterization of any films, printing papers and equipment. Also, an instrument designed according to the principles of the invention can be used with any darkroom equipment and will permit the operator to filter out undesired color of any film, printing papers and equipment one color at a time until a desired permanent filter is obtained.

Having thus described the invention in accordance with the preferred embodiment thereof, it will be obvious to those skilled in the art that various revisions and modifications can be made to the embodiment described herein without departing from the spirit and scope of the invention. It is my intention however that all such revisions and modifications as well as uses for the invention will be included within the scope of the following claims.

What is claimed is:

1. A method of printing photo print and the like from negative or positive film transparencies placed into a lighted printing means capable of projecting the image from said film when placed in said lighted printing means, said method comprising the steps of: measuring the intensity of the light produced by said printing means without the film to be printed in place; measuring the intensity of the light produced by the average density of the image produced by said printing means with the film in place in said printing means; subtracting the intensity of the first measurement from the second measurement to produce a tentative reading that is a multiple of the exposure time; placing a desired filter in place in the printing means; and measuring the intensity of the light a third time to produce a final reading of the exposure time of the film to be printed.

2. An apparatus for use in printing photo prints and the like from negative or positive film transparencies placed into a lighted printing means capable of projecting the image from said film when placed in said lighted printing means, said apparatus comprising light sensing means for measuring the intensity of the light produced by said printing means and producing an ouput in proportion to the light sensed, display means responsive to said light sensing means for producing a perceptible output of said light sensing means, a first control means for adjusting said display means to a zero reading, second control means for setting said display means to a value based upon the output of said light sensing, set control means for storing the output of said light sensing means, and means for comparing a stored output with an actual output from said light sensing means to produce a perceptible output in said display means.

3. The apparatus of claim 2 in which the display means produces a digital reading in seconds of exposure time.

* * * * *